(12) United States Patent
Lakshmanan et al.

(10) Patent No.: US 6,730,161 B2
(45) Date of Patent: May 4, 2004

(54) TREATMENT OF FLY ASH

(75) Inventors: Vaikuntam Iyer Lakshmanan, Ontario (CA); Ramamritham Sridhar, Mississauga (CA); Noel Paul Mailvaganam, Orleans (CA); V. Mohan Malhotra, Ottawa (CA)

(73) Assignee: Process Research Ortech, Inc., Mississauga (CA)

( * ) Notice: Subject to any disclaimer, the term of this patent is extended or adjusted under 35 U.S.C. 154(b) by 0 days.

(21) Appl. No.: 10/177,659

(22) Filed: Jun. 20, 2002

(65) Prior Publication Data
US 2003/0079656 A1 May 1, 2003

Related U.S. Application Data

(60) Provisional application No. 60/299,644, filed on Jun. 20, 2001.

(51) Int. Cl.[7] .......................... C04B 18/08; C04B 18/06
(52) U.S. Cl. .................. 106/705; 106/706; 106/709; 106/DIG. 1; 209/11; 209/38; 209/238
(58) Field of Search .................. 106/705, 706, 106/709, DIG. 1; 209/11, 38, 238

(56) References Cited

U.S. PATENT DOCUMENTS

| | | | | |
|---|---|---|---|---|
| 2,698,252 A | * | 12/1954 | Havelin et al. | 106/706 |
| 3,852,084 A | * | 12/1974 | Webster et al. | 106/710 |
| 4,377,414 A | * | 3/1983 | Buschmann et al. | 588/257 |
| 4,482,096 A | * | 11/1984 | Lin | 241/65 |
| 4,607,021 A | * | 8/1986 | Corbin et al. | 502/185 |
| 4,715,896 A | * | 12/1987 | Berry | 106/707 |
| 4,877,453 A | * | 10/1989 | Loggers | 106/710 |
| 5,556,458 A | * | 9/1996 | Brook et al. | 106/708 |
| 5,681,384 A | * | 10/1997 | Liskowitz et al. | 106/710 |
| 5,997,632 A | * | 12/1999 | Styron | 106/705 |
| 6,251,178 B1 | * | 6/2001 | Styron | 106/709 |
| 2003/0132140 A1 | * | 7/2003 | Oder et al. | 209/218 |

FOREIGN PATENT DOCUMENTS

| | | | |
|---|---|---|---|
| EP | 000492758 A2 | * | 1/1992 |
| GB | 001524484 A | * | 4/1978 |
| JP | 11-60310 A | * | 3/1999 |
| JP | 11349943 A | * | 12/1999 |
| WO | WO 90/13524 A1 | * | 11/1990 |

OTHER PUBLICATIONS

Derwent Abstract No. 1975–40974W, abstract of Belgium Patent Specification No. 824788 (May 1975).*
Derwent Abstract No. 2001–183488, abstract of Chinese Patent Specification No. 1271697 (Nov. 2000).*

* cited by examiner

Primary Examiner—Anthony J. Green
(74) Attorney, Agent, or Firm—Ohlandt, Greeley, Ruggiero & Perle

(57) ABSTRACT

A finely ground powder comprising a mixture of fly ash and a compound selected from the group consisting of alkali and alkaline earth metal salts, alkali and alkaline earth metal oxides, and metakaolinite. Preferably, the amount of said compound is 0.4 to 1% by weight of the powder. A composition comprising Portland cement and finely ground powder, said finely ground powder being a mixture of fly ash and a compound selected from the group consisting of alkali and alkaline earth metal salts, alkali and alkaline earth metal oxides, and metakaolinite. A method for the treatment of fly ash comprising the step of subjecting a mixture of fly ash and a compound selected from the group consisting of alkali and alkaline earth metal salts, alkali and alkaline earth metal oxides, and metakaolinite, preferably in which the fly ash has been treated for removal of carbon and in particular to increase the amount of crystalline phase.

21 Claims, 4 Drawing Sheets

TREATMENT OF FLY ASH

RELATED APPLICATION

The present application claims priority to U.S. provisional patent application serial No. 60/299,644 filed on Jun. 20, 2001.

FIELD OF THE INVENTION

The present invention relates to a method for the treatment of fly ash containing additives, and to the treated fly ash so obtained. In particular, the method relates to the grinding of fly ash containing additives and separation of magnetic particles therefrom. In preferred embodiments, the fly ash is subjected to treatment at high temperature prior to grinding e.g. to remove carbon products. An example of fly ash is Type F fly ash. The present invention also relates to so-called Ordinary Portland cement (OPC) containing fly ash and an additive, especially an additive that permits control and adjustment of the crystalline content of fly ash for optimization of performance of OPC containing fly ash.

BACKGROUND TO THE INVENTION

Fly ash is a fine particulate product that is produced by the combustion of powdered coal with a forced draft, and is generally carried off with the flue gases. Under governmental and other regulations relating to the environment, it is necessary to remove fly ash from flue gases before discharge of the flue gases to the atmosphere. Special equipment is required to do so e.g. electrostatic precipitators.

The fly ash that is obtained is a mixture of alumina, silica, unburned carbon and various metallic oxides. There are indications that fly ash that passes through electrostatic precipitators in flue gas stacks may have mutagenic properties.

The metallic components of fly ash include aluminum, iron and titanium. These components may be recovered by calsintering i.e. heating the fly ash to 1200° C. with a mixture of limestone and gypsum followed by treatment with sulphuric acid.

Fly ash is reported to have a wide variety of end uses, including as an additive for cement intended for oil-well casing, as an absorbent for oil spills, as a replacement for lime in the scrubbing of sulphur dioxide from flue gas, as a filler for plastics, for removal of heavy metals from industrial waste waters and separation of oil-sand tailings. However, as discussed below, addition of fly ash to ordinary Portland cement causes retardation of development of the strength of the cement. For example, addition of >20% of fly ash delays the setting of OPC and increases the period for attainment of the strength required to permit demoulding of the cement from a frame or mould. The setting may be delayed for many hours, the delay depending on the level of replacement of concrete with fly ash. The delay also depends on temperature. For example, in temperate climates, the setting could be delayed from a time of about 18 hours to a time of about 70 hours.

Further methods of treatment of fly ash, and further uses of treated fly ash, would be beneficial.

SUMMARY OF THE INVENTION

A method of treatment of fly ash, and the resultant product have now been found.

Accordingly, one aspect of the present invention provides a finely ground powder comprising a mixture of fly ash and at least one compound selected from the group consisting of alkali and alkaline earth metal salts, alkali and alkaline earth metal oxides, and metakaolinite.

In preferred embodiments of the invention, the amount of said compound is 0.4 to 1% by weight of the powder.

In a further embodiment, the powder has been treated for removal of magnetic particles.

In another preferred embodiment, the mixture has been subjected to a gas/solid reactor.

Another aspect of the present invention provides a method for the preparation of a composition comprising the steps of (a) admixing fly ash and at least one compound selected from the group consisting of alkali and alkaline earth metal salts, alkali and alkaline earth metal oxides, and metakaolinite, and (b) subjecting the mixture of fly ash and at least one compound to a fine grinding procedure.

In a preferred embodiment of the method of the present invention, the admixture of fly ash and at least one compound has been subjected to treatment in a gas/solid reactor. In particular, prior to step (b), the admixture of fly ash and at least one compound has been subjected to treatment in a gas/solid reactor e.g. to effect decarbonization of the fly ash. Preferably, the gas/solid reactor is operated under conditions that promote an increase in the amount of crystalline fraction of the fly ash relative to the amount of amorphous phase.

In embodiments, the admixture of fly ash and at least one compound so obtained is treated for removal of magnetic compounds.

In preferred embodiments, subsequent to step (b), the ground mixture is subjected to air classification to separate fine particles of a pre-determined particle size.

A further aspect of the present invention provides a composition comprising Portland cement and finely ground powder, said finely ground powder being a mixture of fly ash and at least one compound selected from the group consisting of alkali and alkaline earth metal salts, alkali and alkaline earth metal oxides, and metakaolinite. In particular, the amount of said compound is 0.4 to 1% by weight of the powder.

In preferred embodiments of the composition, the amount of said finely ground powder is at least 20% by weight of the composition, especially at least 25% by weight of the composition and preferably at least 30% by weight of the composition.

BRIEF DESCRIPTION OF THE DRAWINGS

The present invention is illustrated by the embodiments shown in the drawing in which.

DETAILED DESCRIPTION OF THE INVENTION

The present invention relates to a method for the treatment of fly ash, in which the fly ash is ground to a fine particle size. An additive to increase the rate of setting of mixtures of ordinary Portland cement and fly ash i.e. reduce the retardation of the development of strength of the cement, is added to the fly ash, normally before the fly ash is ground. The fly ash may also be treated in a gas/solid reactor at elevated temperature to reduce the carbon content of the fly ash. In embodiments, treatment in the gas/solid reactor is used to adjust the crystalline content of the fly ash. The ground fly ash is classified to separate the fine particles, with oversize particles typically being recycled for further grinding. The separated fine ground particles are then subjected to magnetic separation, especially to remove both strongly magnetic particles and weakly magnetic particles.

A variety of types of fly ash may be used, with a preferred fly ash being Type F fly ash.

Figure 1:
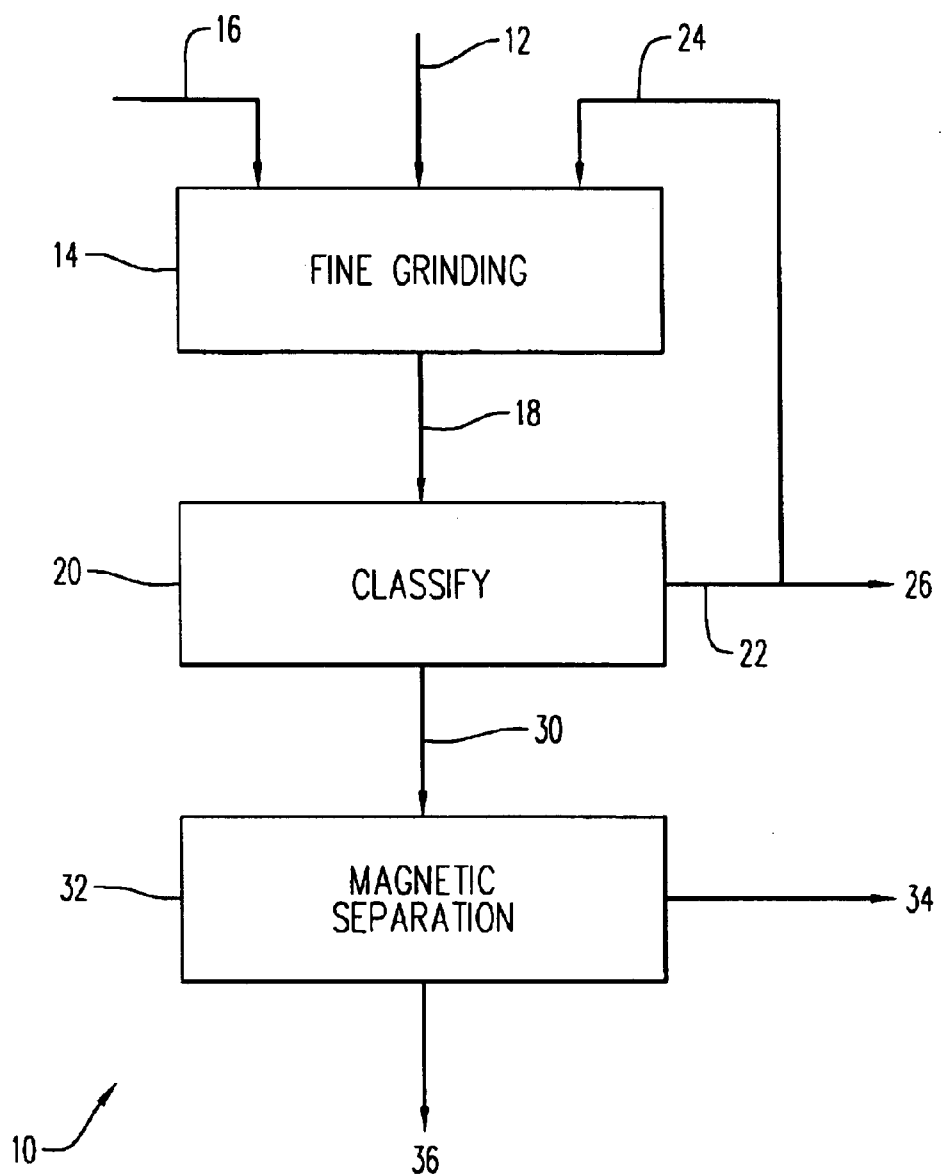
FIG. 1 is a schematic representation of a method for the treatment of fly ash.

An embodiment of the method is illustrated in FIG. 1, being generally indicated by 10. In method 10, fly ash 12 is fed to fine grinder step 14. The particle size of fly ash 12 may vary over a wide range, depending on the source of the fly ash. In addition, the composition of the fly ash will also vary with the source, especially with respect to the particular source of coal that has been used and the conditions under which the coal has been burnt. The fly ash will typically contain alumina in amounts in the range of about 12 to about 25% by weight, silica in amounts in the range of about 35 to about 55% by weight, unburned carbon in amounts in the range of about 0.5 to about 7% by weight, and various metallic oxides. However, it is to be understood that the composition of the fly ash will vary with the source of the fly ash.

Admixed additives 16 may also be added to fine grinding step 14. Such additives are additives that reduce the retardation of the setting of ordinary Portland cement. Examples of such additives include lime and oxides of alkaline earth metals e.g. calcium oxide, magnesium oxide and mixed oxides of alkaline earth metals, alkali metal salts and metakaolinite. It is preferred that the additives be admixed with the fly ash prior to grinding so that all particles ultimately obtained in the process have the same range of particle sizes.

In fine grinding step 14, the fly ash and additives are subjected to a fine grinding. Any apparatus suitable for the grinding of fly ash may be used. The fly ash and additives are preferably ground in fine grinding step 14 so that less than 50%, and especially less than 25%, of the particles have a particle size greater than that desired for a particular application. Such particle sizes may vary with the intended end use.

Ground fly ash 18 is transferred to classifier 20, in which the ground particles are subjected to air classification. Suitable air classification apparatus is known. In air classification, the ground particles are separated according to specific gravity, which generally corresponds to particle size, by suspension or settling from an air stream. The oversize particles settle out first and are separated, 22, for recycle to the grinding step, 24, or for other use 26. It is understood that fine particles of various sizes may be separated in the classification step.

The selected fine particles 30 are subjected to magnetic separation step 32. Magnetic separation step 32 may be operated for separation of strongly magnetic particles e.g. iron and iron oxides and/or for the separation of weakly magnetic particles e.g. aluminum and titanium dioxide. The various magnetic particles so separated are discharged as magnetic particles 34. Preferably, the magnetic separation step is operated as a two-step separation process, with separation of highly magnetic particles being followed by separation of weakly magnetic particles.

Finely ground non-magnetic particles 36 are separated from the magnetic separation step. Such particles are particularly intended for use as a filler in ordinary Portland cement.

Figure 2:
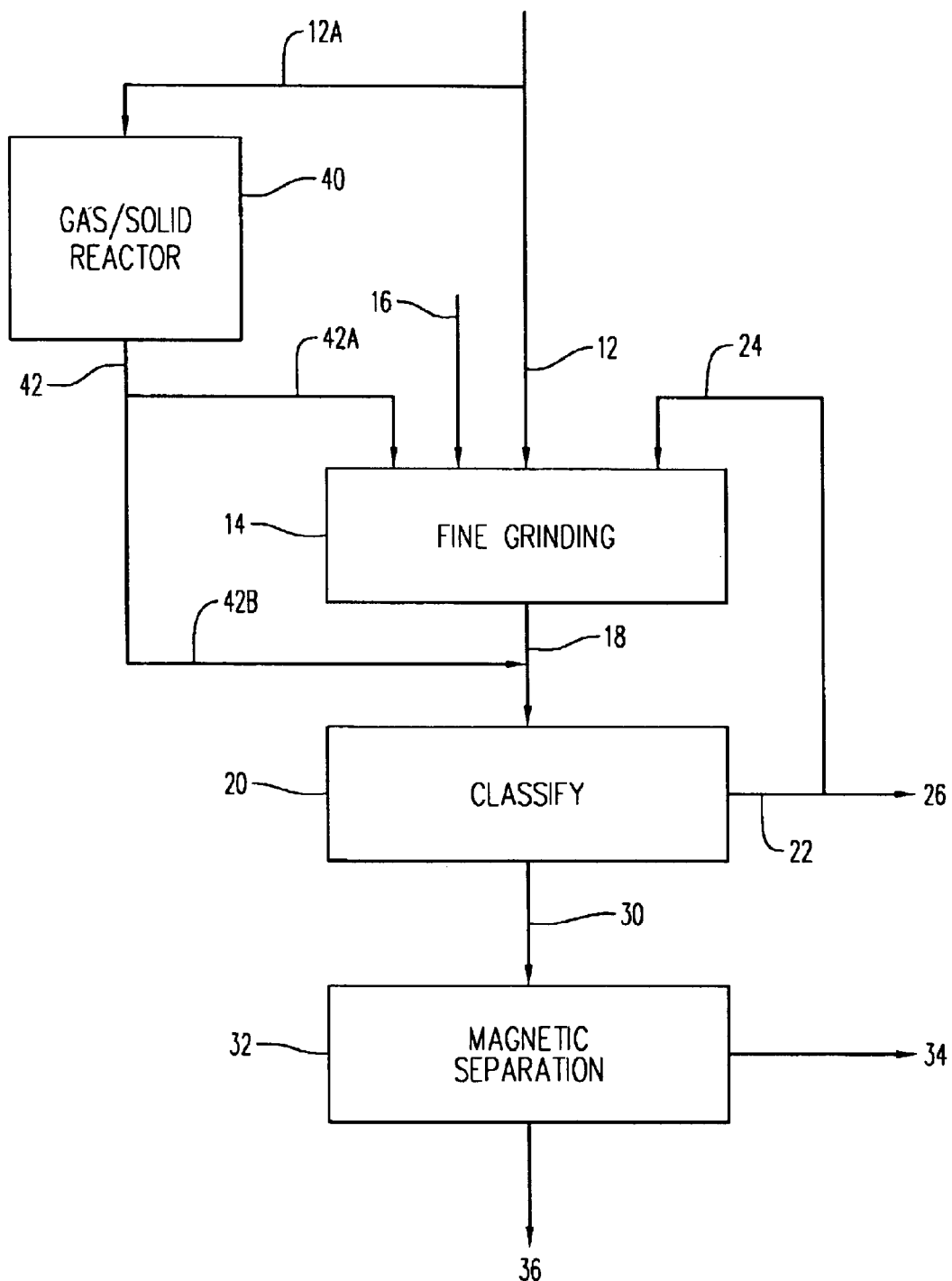
FIG. 2 is a schematic representation of the method of FIG. 1 with a gas/solid reactor for treatment of fly ash.

A further embodiment of the invention is shown in FIG. 2. The process of FIG. 2 is the same as that shown in FIG. 1 except that gas/solid reactor 40 has been inserted in the process. Gas/solid reactor 40 is operated at a temperature and under other controlled conditions such that carbon in the fly ash is removed i.e. carbon is converted to carbon monoxide or carbon dioxide and removed as volatile matter, and to promote crystallization of the fly ash. In particular, the reactor is operated under conditions to promote formation of crystalline phase, as discussed and exemplified herein. Examples of such gas/solid reactors are known, and in particular include fluidized bed reactors and a reactor known as a Torbed reactor. In such reactors, particles are subjected to elevated temperature in a fluidized flow to effect treatment of the particles.

In FIG. 2, particles of fly ash 12A are subjected to gas/solid reactor 40 instead of being sent directly to fine grinding 14. In gas/solid reactor 40, the particles are subjected to elevated temperature and under controlled conditions to effect removal of carbon the fly ash, as discussed above. The treated particles 42 passing from gas/solid reactor 40 may be directed, 42A, to fine grinding step 14, or may be directed, 12B, to classifier 20. Alternatively, treated particles 42 may be offered for sale without further treatment. It is anticipated that the particles would normally be directed to fine grinding step 14.

In FIG. 2, admixed additives 16 are shown as being fed directly into fine grinding step 14. However, it is to be understood that in an alternative embodiment the admixed additives may be admixed with particles 12A and/or fed separately to gas/solid reactor 40, as also indicated in FIG. 2 by 16A. Thus, in the latter embodiment of the invention the additives are subjected to the gas/solid reactor.

Fly ash treated according to the process of the present invention includes an increased content of crystalline fraction. In preferred embodiments of the invention, the temperature and residence time in the gas/solid reactor are controlled and manipulated to control and adjust the amount of crystalline phase in the fly ash, and to reduce the amount of glass or amorphous silicaceous phase in the fly ash. The crystalline phase is formed from the glassy phase in the reactor in the presence of alkali and alkaline earth metal salts. The crystalline phase is more reactive with calcium hydroxide generated from hydration of Ordinary Portland cement, compared with the glassy phase, and thus facilitate setting of cement.

In preferred embodiments of the present invention, the composition of fly ash and admixed additives obtained is used as a supplementary cementing material in Ordinary Portland cement. In preferred embodiments, the composition of fly ash and additives is mixed into Portland cement in amounts of at least 20% by weight, especially at least 25% by weight and more preferably at least 30% by weight. In such embodiments, the amount of additive in the fly ash should be at least 0.4% by weight, and preferably in the range of 0.4 to 1% by weight. Examples of the additive are discussed above.

In the preferred embodiment, Portland cement is replaced by a supplementary cementing material i.e. the fly ash compositions described herein, that is less expensive on a volume basis, and generally is substantially less expensive. Moreover, the use of the additive overcomes the problem of retardation of development of strength in blends of Portland cement and fly ash that is caused by addition of the fly ash, and substantially reverts the setting time to that of Portland cement in the absence of addition of fly ash.

The present invention is illustrated by the following examples.

EXAMPLE I

To determine the effect of addition of fly ash and fly ash plus additive to Ordinary Portland cement, a series of tests were carried out using:

(a) Ordinary Portland cement (OPC);
(b) OPC (70% by weight) and fly ash plus additive (FAA) (30% by weight); and
(c) OPC (70% by weight) and fly ash (FA) (30% by weight).

The fly ash was obtained from Port Tupper, Nova Scotia, Canada as Type F fly ash, and had been calcined at a temperature of about 800° C. In mixture (c), the fly ash was admixed with alkali metal salts in a ratio of 0.6% by weight of total cementitious material. The admixture was ground, and subjected to air classification. Particles having a size of less than 74 microns were selected and used as FAA.

The above fly ash without additive was subjected to the same procedure and used as FA.

Figure 3:
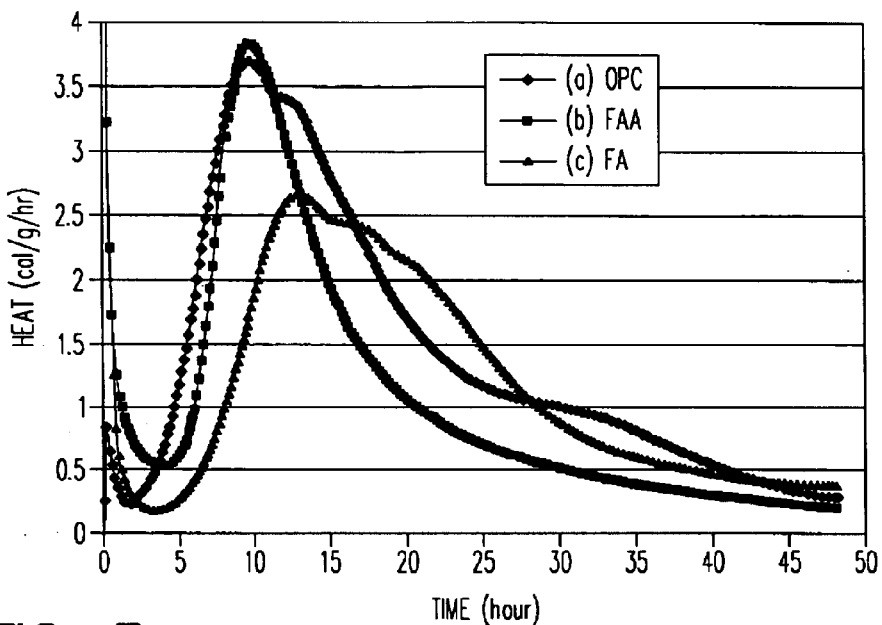
FIG. 3 is a graphical representation of heat of hydration of cement and cement/fly ash mixtures.

The mixtures (a), (b) and (c) were combined with water in a ratio of water:cement of 0.38%. The heat of hydration was determined for each of the resultant cement compositions over a period of time. The results obtained are shown in FIG. 3, which shows the heat of hydration in cal/g/hr.

The mixture of the invention, i.e. FAA (mixture (b)), showed a heat of hydration curve with a peak that was very similar to that obtained for 100% OPC i.e. mixture (a). However, the peak obtained for the mixture of OPC and fly ash without additive i.e. FA (mixture (c)), was retarded by about 5 hours i.e. the peak occurred at a time that was about 50% longer than for either OPC or FAA.

Figure 4:
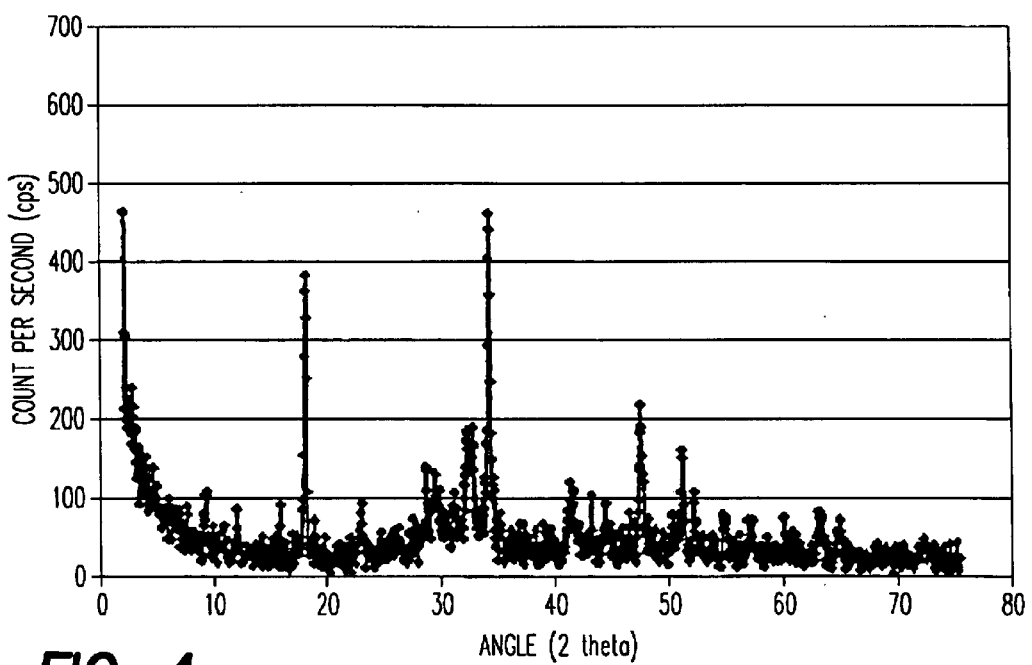
FIGS. 4–6 are representations of X-ray diffraction spectra for hydrated cement and for cement/fly ash pastes with and without additives.
Figure 5:
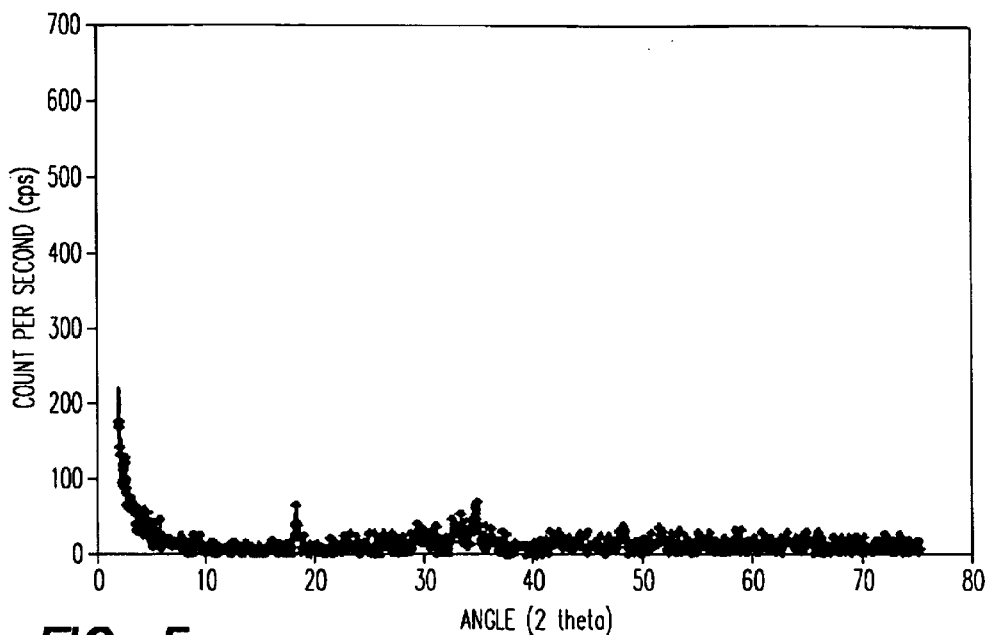
Figure 6:
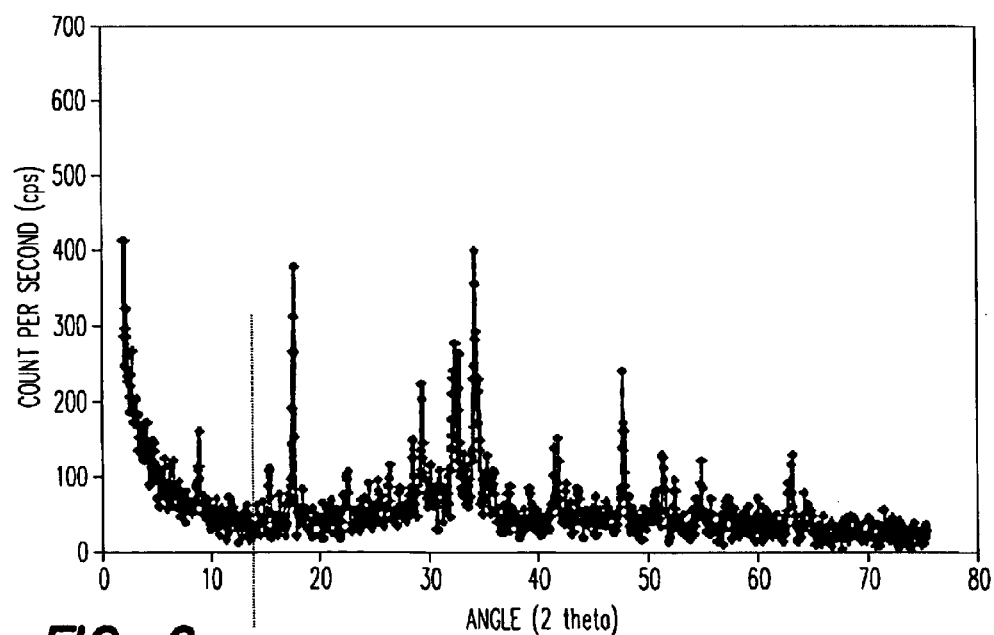

The hydrated products were studied by X-ray diffraction. FIG. 4 shows the X-ray pattern for hydrated OPC, FIG. 5 shows the X-ray diffraction pattern for hydrated FA i.e. OPC and fly ash without additive, and FIG. 6 shows the X-ray diffraction pattern for FAA i.e. OPC and fly ash including additive. It was found that the X-ray diffraction pattern for FA lacks the major peaks obtained with OPC (FIG. 4), thereby showing that the formation of hydrates was incipient and delayed. However, FIG. 6 shows the peaks of FIG. 4, with some peaks being enhanced. This is believed to indicate the increased presence of crystalline phase in the fly ash that had been calcined with additive.

The results show that the use of the composition of the invention i.e. FAA, was similar to OPC without any additives, and substantially different from use of fly ash without additive (FA). The FM sample had enhanced crystalline phase.

EXAMPLE II

Mortar compressive strength tests were carried out with the compositions of Example I. The tests were carried out on the hardened mortar that had been formed after one day (24 hours) using the procedure of ASTM C-109.

The results obtained are shown in Table I.

TABLE I

| Mixture | Compressive Strength* (MPa) |
| --- | --- |
| OPC | 20.3 |
| FA | 14.6 |
| FAA | 18.7 |
| FAC** | 14.0 |

*At least three samples were tested.
*A comparative sample of OPC (70%) and FA (30%) in which the FA contained a commercially available accelerator, which is understood to be calcium nitrate based additive.

The results show that the composition of the present invention (FM) had superior compressive strength after 24 hours than the other compositions containing fly ash (FA and FAC).

What is claimed is:

1. A finely ground powder comprising a mixture of fly ash and at least one compound selected from the group consisting of alkali and alkaline earth metal oxides, and metakaolinite, in which the powder has been treated for removal of magnetic particles.

2. The finely ground powder of claim 1 in which the amount of said compound is 0.4 to 1% by weight of the powder.

3. The finely ground powder of claim 1 which the mixture has been subjected to a gas/solid reactor.

4. The finely ground powder of claim 1 in which the compound is calcium or magnesium oxide.

5. A method for the preparation of a composition comprising the steps of (a) admixing fly ash and at least one compound selected from the group consisting of alkali and alkaline earth metal salts, alkali and alkaline earth metal oxides, and metakaolinite, and (b) subjecting the mixture of fly ash and at least one compound to a fine grinding procedure, in which the admixture of fly ash and at least one compound has been subjected to treatment in a gas/solid reactor.

6. The method of claim 5 in which the gas/solid reactor is operated under conditions such that the amount of crystalline phase in the fly ash is increased relative to the amount of amorphous phase.

7. A method for the preparation of a composition comprising the steps of (a) admixing fly ash and at least one compound selected from the group consisting of alkali and alkaline earth metal salts, alkali and alkaline earth metal oxides, and metakaolinite, and (b) subjecting the mixture of fly ash and at least one compound to a fine grinding procedure, in which, prior to step (b), the admixture of fly ash and at least one compound has been subjected to treatment in a gas/solid reactor.

8. The method of claim 7 in which the gas/solid reactor is operated under conditions such that the amount of crystalline phase in the fly ash is monitored and controlled.

9. The method of claim 8 in which the admixture of fly ash and at least one compound so obtained is treated for removal of magnetic compounds.

10. The method of claim 7 in which, subsequent to step (b), the ground mixture is subjected to air classification to separate fine particles of a selected particle size.

11. The method of claim 10 in which the fine particles obtained by air classification are treated for removal of magnetic particles.

12. The method of claim 7 in which said step of heating in a gas/solid reactor effects an increase in the amount of crystalline phase in the fly ash.

13. The method of claim 7 in which the compound is magnesium or calcium oxide.

14. A method for the preparation of a composition comprising the steps of (a) admixing fly ash and at least one compound selected from the group consisting of alkali and alkaline earth metal salts, alkali or alkaline earth metal oxides, and metakaolinite, and (b) subjecting the mixture of fly ash and at least one compound to a fine grinding procedure in which, prior to step (a), the fly ash is subjected to a step of heating in a gas/solid reactor to effect decarbonization of the fly ash.

15. A method for the preparation of a composition comprising the steps of (a) ad mixing fly ash and at least one compound selected from the group consisting of alkali and alkaline earth metal salts, alkali and alkaline earth metal oxides, and metakaolinite, (b) subjecting the mixture of fly ash and at least one compound to a fine grinding procedure, and (c) subjecting the ground mixture to air classification to separate fine particles of a selected particle size.

16. A composition comprising Portland cement and finely ground powder, said finely ground powder being a mixture of fly ash and at least one compound selected from the group consisting of alkali and alkaline earth metal salts, alkali and alkaline earth metal oxides, and metakaolinite, in which the powder has been obtained by the method comprising the steps of (a) admixing fly ash and at least one compound selected from the group consisting of alkali and alkaline earth metal salts, alkali and alkaline earth metal oxides, and metakaolinite, and (b) subjecting the mixture of fly ash and at least one compound to a fine grinding procedure, in which the admixture of fly ash and at least one compound has been subjected to heating in a gas/solid reactor.

17. The composition of claim 16 in which the amount of said compound is 0.4 to 1% by weight of the powder.

18. The composition of claim 16 in which the amount of said finely ground powder is at least 20% by weight of the composition.

19. The composition of claim 18 in which the amount of said finely ground powder is at least 25% by weight of the composition.

20. The composition of claim 18 in which the amount of said finely ground powder is at least 30% by weight of the composition.

21. The composition of claim 16 in which the compound is magnesium or calcium oxide.

* * * * *